United States Patent
Kubota (10) Patent No.: US 8,223,397 B2
(45) Date of Patent: Jul. 17, 2012

(54) IMAGE PROCESSING APPARATUS, IMAGE PROCESSING METHOD, AND RECORDING MEDIUM

(75) Inventor: Hajime Kubota, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 984 days.

(21) Appl. No.: 12/230,834

(22) Filed: Sep. 5, 2008

(65) Prior Publication Data

US 2009/0073470 A1 Mar. 19, 2009

(30) Foreign Application Priority Data

Sep. 14, 2007 (JP) .................................. 2007-240200

(51) Int. Cl.
*G06F 15/00* (2006.01)
*G06F 3/12* (2006.01)
*H04N 1/60* (2006.01)

(52) U.S. Cl. .................. 358/1.9; 358/1.13; 358/1.17

(58) Field of Classification Search .................. None
See application file for complete search history.

(56) References Cited

U.S. PATENT DOCUMENTS

| | | | | |
|---|---|---|---|---|
| 5,265,209 A * | 11/1993 | Kageyama et al. | ............ | 358/1.2 |
| 6,052,202 A * | 4/2000 | Shimizu | ....................... | 358/1.16 |
| 2002/0089682 A1 * | 7/2002 | Yang et al. | .................... | 358/1.12 |
| 2002/0093671 A1 * | 7/2002 | Ohno | .............................. | 358/1.9 |
| 2003/0107767 A1 * | 6/2003 | Ishizaki | ....................... | 358/1.18 |
| 2003/0202212 A1 * | 10/2003 | Burgess et al. | ............. | 358/1.18 |
| 2007/0064255 A1 * | 3/2007 | Ichikawa | ..................... | 358/1.13 |
| 2007/0279420 A1 * | 12/2007 | Ichikawa | ..................... | 345/501 |

FOREIGN PATENT DOCUMENTS

| | | |
|---|---|---|
| JP | 2000-151982 | 5/2000 |
| JP | 2005-182692 | 7/2005 |

OTHER PUBLICATIONS

Office Action dated Sep. 20, 2011 issued in corresponding Japanese Application No. 2004-240200 and English translation thereof.

* cited by examiner

*Primary Examiner* — King Poon
*Assistant Examiner* — Ming Hon
(74) *Attorney, Agent, or Firm* — Harness, Dickey & Pierce (57) ABSTRACT

A preprocessing unit determines a feature of a brush pattern for each line of a background setting command to set a background, and selects a drawing processing method that enables a high speed drawing process from among a plurality of drawing processing methods based on the determined feature of the brush pattern. A post-processing unit performs a drawing process based on the drawing processing method selected by the preprocessing unit.

8 Claims, 7 Drawing Sheets

FIG. 11 ic # IMAGE PROCESSING APPARATUS, IMAGE PROCESSING METHOD, AND RECORDING MEDIUM

CROSS-REFERENCE TO RELATED APPLICATIONS

The present application claims priority to and incorporates by reference the entire contents of Japanese priority document 2007-240200 filed in Japan on Sep. 14, 2007.

BACKGROUND OF THE INVENTION

1. Field of the Invention

The present invention relates to a technology for creating background drawing data in an image processing apparatus.

2. Description of the Related Art

In typical printers, upon receipt of a print request from an information processing device such as a personal computer (PC), image processing is performed such that a drawing command constituting page description language (PDL) data is interpreted and intermediate data is generated based on interpretation of the drawing command. The intermediate data is then stored in a spool memory, and drawing data is generated in a drawing memory based on the intermediate data. The drawing command constituting the PDL data includes commands to make settings for graphics, images, character, brush, and the like.

In recent years, there is a demand for speeding up drawing processing corresponding to a command to set a brush. A conventional technique for speeding up the drawing processing is disclosed in, for example, Japanese Patent Application Laid-open No. 2005-182692. In the technique, whether to convert a drawing command from one to another is determined based on a predetermined condition. Specifically, when the predetermined condition is satisfied, a drawing command including a transparent operation is converted into another drawing command not requiring the transparent operation.

SUMMARY OF THE INVENTION

It is an object of the present invention to at least partially solve the problems in the conventional technology.

According to an aspect of the present invention, there is provided an image processing apparatus that generates drawing data based on a drawing command, the drawing command including a background setting command that sets a background of the drawing data. The image processing apparatus includes a feature determining unit that determines a feature of a background for each line in the drawing command; and a background drawing unit that selects for each line a drawing method enabling a high-speed drawing process depending on the feature of that line, and draws drawing data corresponding to the background based on the background setting command and selected drawing method.

According to another aspect of the present invention, there is provided an image processing method of generating drawing data based on a drawing command, the drawing command including a background setting command that sets a background. The image processing method includes determining a feature of a background for each line in the drawing command; selecting for each line a drawing method enabling a high-speed drawing process depending on the feature of that line; and drawing drawing data corresponding to the background based on the background setting command and the drawing method selected at the selecting.

According to still another aspect of the present invention, there is provided a computer-readable recording medium that stores therein a computer program that implements the above method on a computer.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. The present invention is not limited to the embodiments. Constituent elements in the embodiments include ones easily assumed by those skilled in the art and practically equivalent ones. An embodiment of the present invention is explained with a brush setting command for setting a brush as an example of a background setting command.

Figure 1:
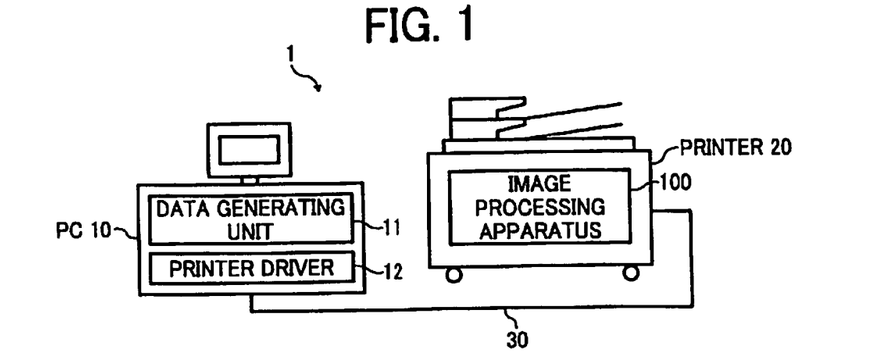
FIG. 1 is a schematic diagram of a configuration of an image processing system according to an embodiment of the present invention.

FIG. 1 is a schematic diagram an image processing system 1 according to the present embodiment. The image processing system 1 includes a PC 10 and a printer 20. The PC 10 outputs a drawing command including the brush setting command. The printer 20 prints out the drawing command including the brush setting command on a paper. The PC 10 and the printer 20 are connected to each other via a cable 30 enabling mutual communication.

The PC 10 includes a data generating unit 11, and a printer driver 12 that converts a drawing command generated by the data generating unit 11 into PDL data.

The data generating unit 11 stores therein various application programs and outputs a drawing command including the brush setting command designated by the application program to the printer driver 12. Upon receiving the drawing command output from the data generating unit 11, the printer driver 12 converts the drawing command into PDL data that is interpretable by the printer 20, and outputs the PDL data to the printer 20.

The printer 20 includes an image processing apparatus 100 that generates drawing data corresponding to the drawing command making up the PDL data from the PC 10.

Figure 2:
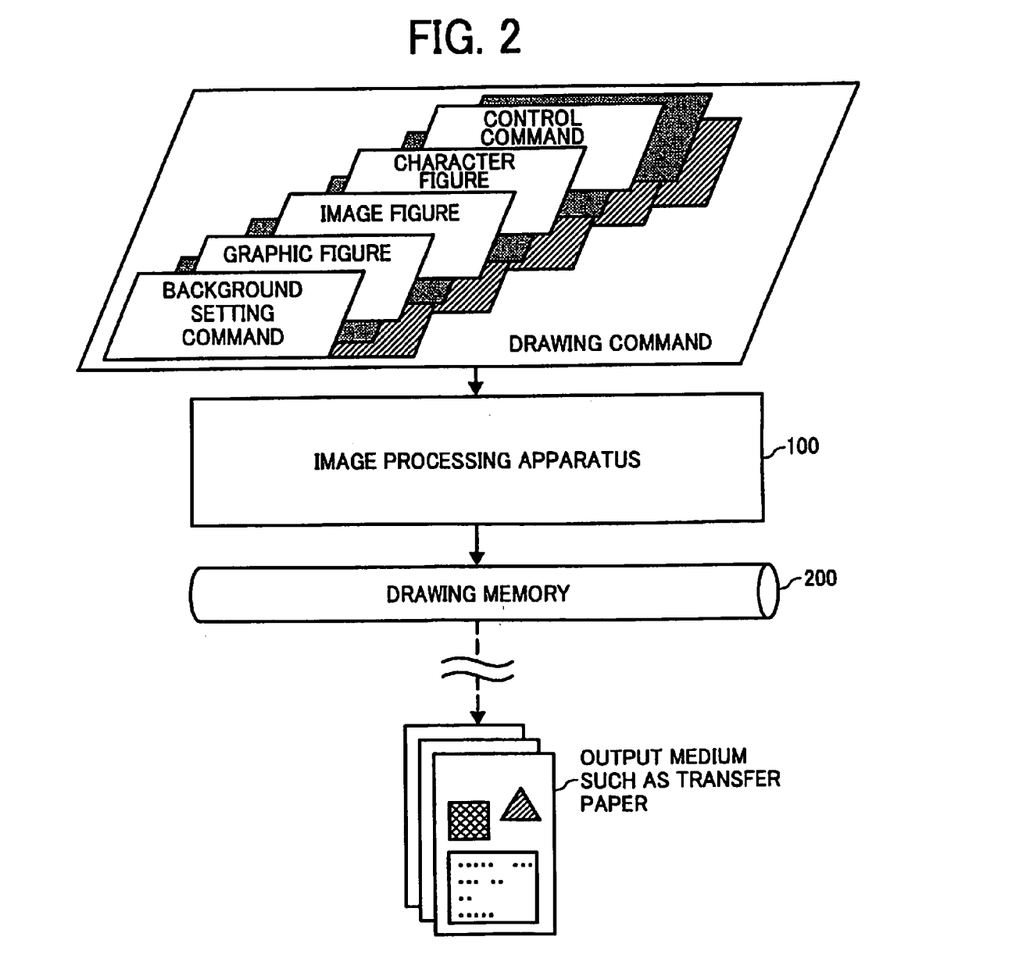
FIG. 2 is a schematic diagram for explaining an overview of basic processing of an image processing apparatus shown in FIG. 1.

FIG. 2 is a schematic diagram for explaining an overview of basic processing performed by the image processing apparatus 100. The image processing apparatus 100 receives a drawing command including a graphics drawing command for graphics, image, character, and the like, a control command concerning controls, and the brush setting command to make a brush setting such as setting of a foreground color part, a background color part, and a transparent color part, and generates drawing data corresponding to a received drawing command in a drawing memory 200. Contents written in the drawing memory 200 are eventually drawn on an output medium such as a transfer paper.

Figure 3:
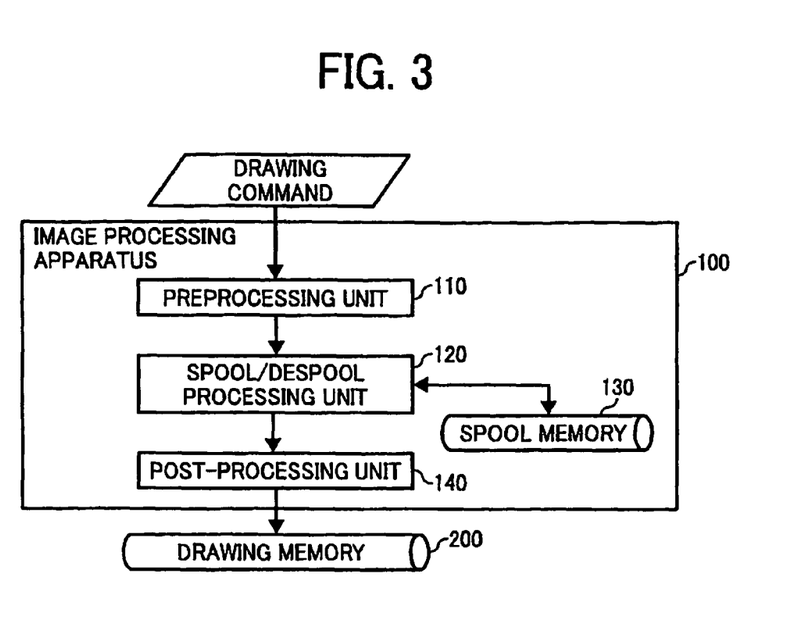
FIG. 3 is a block diagram of the image processing apparatus shown in FIG. 1.

FIG. 3 is a block diagram of the image processing apparatus 100. The image processing apparatus 100 includes a preprocessing unit 110, a spool/despool processing unit 120, a spool memory 130, and a post-processing unit 140.

Upon receiving the drawing command constituting the PDL data, the preprocessing unit 110 outputs intermediate data that is generated based on interpretation of the drawing command to the spool/despool processing unit 120. The spool/despool processing unit 120 stores the intermediate data generated by the preprocessing unit 110 in the spool memory 130 (hereinafter, processing described above is referred to as "spool phase"). The spool/despool processing unit 120 ends the spool phase when the spool memory 130 is filled with the intermediate data, and then reads the intermediate data from the spool memory 130 to output that data to the post-processing unit 140.

The post-processing unit 140 expands the intermediate data read from the spool memory 130 into bitmap data and writes the bitmap data in the drawing memory 200 (hereinafter, processing described above is referred to as "despool phase"). As described above, the image processing apparatus 100 repeats the spool phase and the despool phase, so that the image processing apparatus 100 generates drawing data corresponding to a drawing command.

Figure 4A:
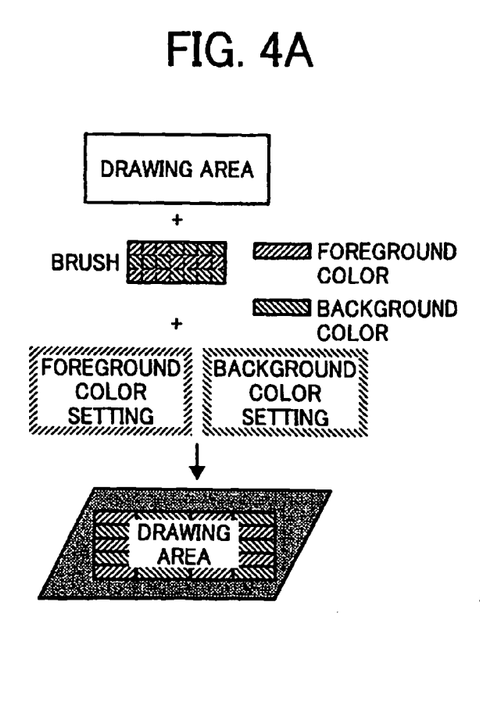
FIG. 4A is a schematic diagram of an example of drawing into a drawing area by a brush constituted of a foreground color part and a background color part.
Figure 4B:
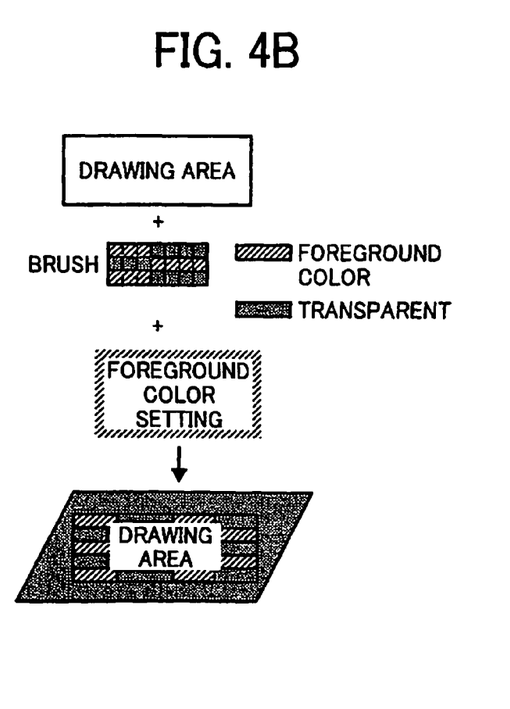
FIG. 4B is a schematic diagram of an example of drawing into a drawing area by a brush constituted of a foreground color part and a transparent color part.

Explanation is given about brush patterns to be drawn with reference to FIGS. 4A to 5C. The following three parts can be included in a brush to be drawn by the image processing apparatus 100: a foreground part to be in a foreground color, a background part to be in a background color, and a transparent color part. FIG. 4A is a schematic diagram of an example of drawing into a drawing area by a brush constituted of the foreground part and the background part. FIG. 4B is a schematic diagram of an example of drawing into a drawing area by a brush constituted of the foreground part and the transparent part. The pattern shown in FIG. 4A with the foreground part and the background part and the pattern shown in FIG. 4B with the foreground part and the transparent part are typical brush patterns to be drawn in the image processing apparatus 100 (hereinafter, these patterns are referred to as "normal pattern").

Figure 5A:
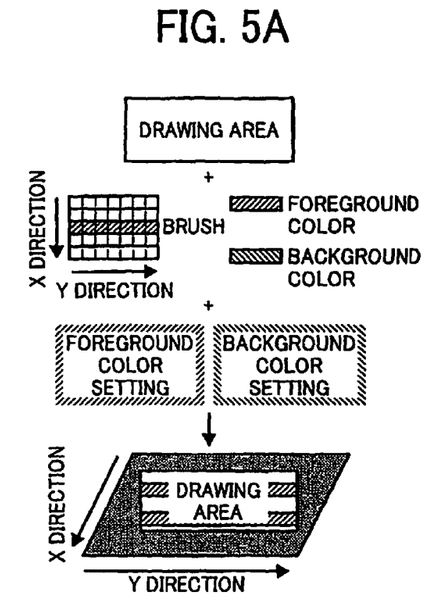
FIG. 5A depicts a drawing result when a brush of an Xn line of a background setting command is formed only of a foreground color part.
Figure 5B:
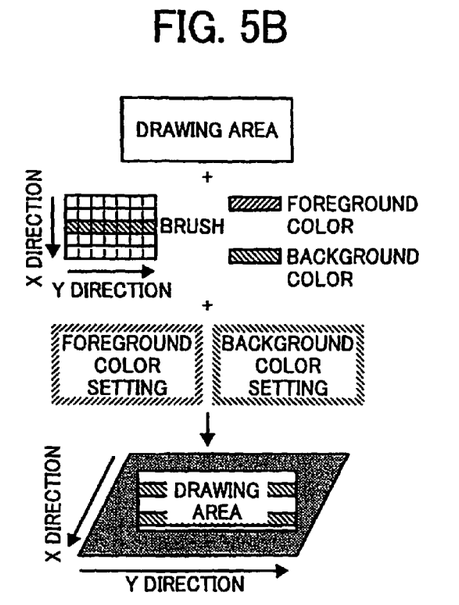
FIG. 5B depicts a drawing result when the brush of the Xn line of the background setting command is formed only of a background color part.
Figure 5C:
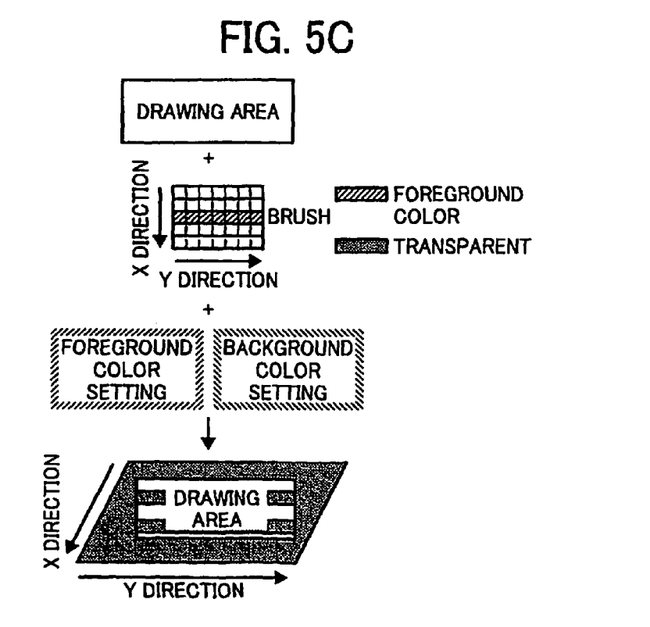
FIG. 5C depicts a drawing result when the brush of the Xn line of the background setting command is formed only of a transparent color part.

On the other hand, a brush pattern can be one as shown in FIGS. 5A to 5C, in which a predetermined line (hereinafter, "Xn line") among a plurality of lines along a Y direction of the brush setting command (hereinafter, "X lines") has a single pattern. FIG. 5A depicts a drawing result when a brush of the Xn line of the brush setting command is formed only of the foreground part. FIG. 5B depicts a drawing result when the brush of the Xn line of the brush setting command is formed only of the background part. FIG. 5C depicts a drawing result when a brush of the Xn line of the brush setting command is formed only of the transparent part.

In the present embodiment, focusing on the Xn line of the brush setting command, when the brush of the Xn line is formed of a single pattern as shown in FIGS. 5A to 5C, brush patterns of one of the foreground part, the background part, and the transparent part are generated for the entire Xn line. Then, drawing is performed every predetermined length (for example, every 32 bits) in the drawing memory 200. This enables to perform the drawing process more speedily compared to a drawing process in which a brush pattern of one of the foreground part, the background part, and the transparent part is generated every predetermined length and drawing is performed in the drawing memory 200 every after the brush pattern is generated.

Figure 6:
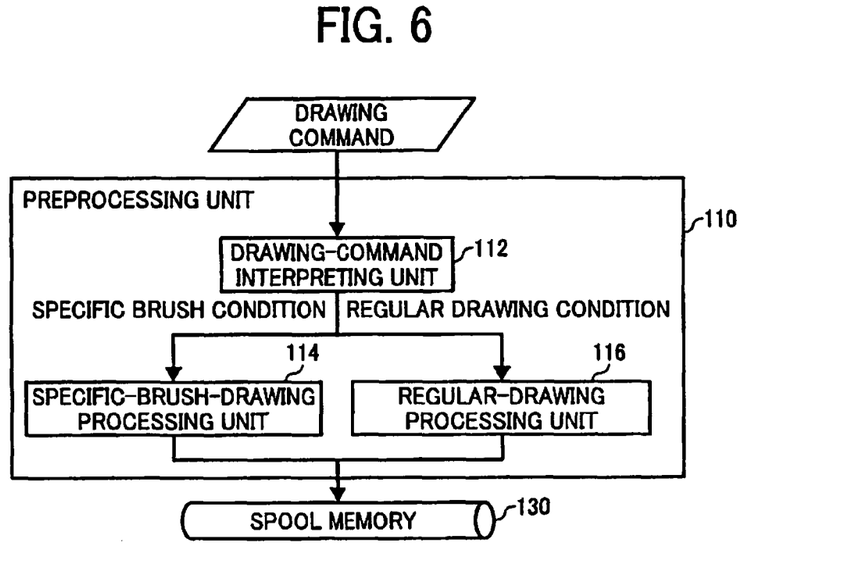
FIG. 6 is a functional block diagram of a preprocessing unit shown in FIG. 3.

FIG. 6 is a functional block diagram of the preprocessing unit 110. The preprocessing unit 110 includes a drawing-command interpreting unit 112, a specific-brush-drawing processing unit 114, and a regular-drawing processing unit 116.

The drawing-command interpreting unit 112 interprets drawing commands making up the PDL data that is input from the PC 10. The specific-brush-drawing processing unit 114 generates intermediate data by performing a process corresponding to a specific brush drawing command. The regular-drawing processing unit 116 generates intermediate data by performing a process corresponding to the drawing commands other than the specific brush drawing command. The intermediate data is subjected to the spool phase, so that the intermediate data is stored in the spool memory 130 by the spool/despool processing unit 120.

Figure 7:
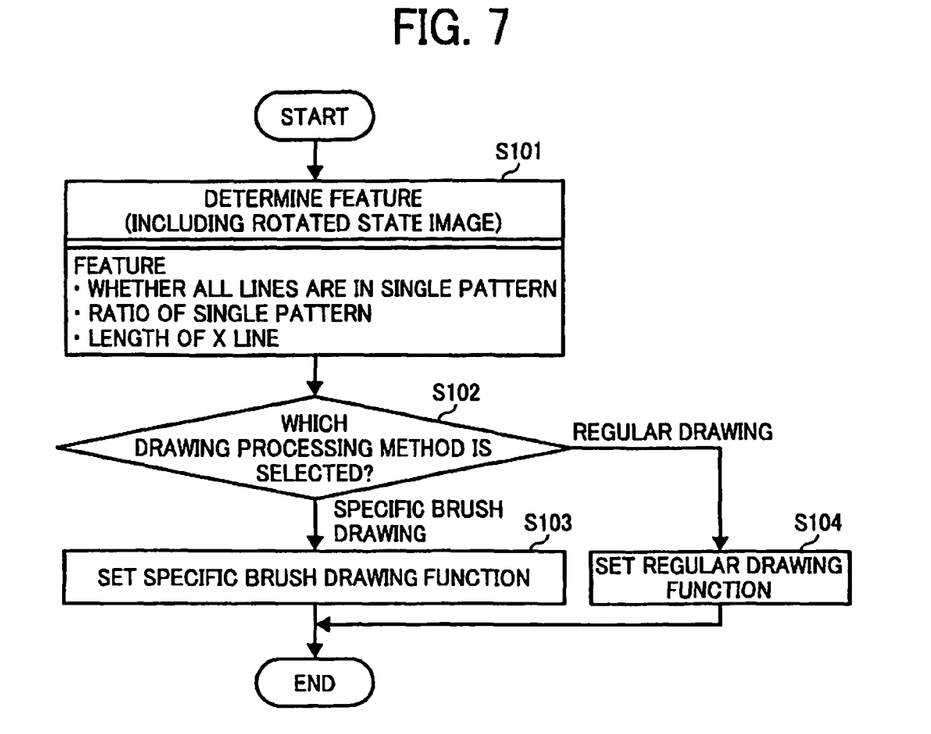
FIG. 7 is a flowchart of a process procedure performed by the preprocessing unit shown in FIG. 6.

FIG. 7 is a flowchart of a process procedure performed by the preprocessing unit 110.

The drawing-command interpreting unit 112 interprets a drawing command and determines (extracts) a feature for each of the X lines of the brush setting command (Step S101). In the present embodiment, features such as (1) whether the brush of each of the X lines is formed of a single pattern (pattern formed of the foreground part only, the background part only, or the transparent part only), (2) a ratio of a single pattern (whether the ratio of the number of lines each having a background formed of a single pattern to the total number of lines in the background setting command exceeds a threshold), and (3) a length of the X line are determined. When drawing data is to be rotated by 90 degrees or 270 degrees, a feature is determined for a Y line after rotation processing during drawing processing.

A drawing processing method enabling a high-speed drawing processing is selected for each of the X lines based on the feature determined at Step S101 (Step S102). When a drawing process can be performed at a higher speed by a specific brush-drawing process than by a regular drawing process (Step S102: "specific brush drawing"), the specific-brush-drawing processing unit 114 set a color calculation drawing-function (hereinafter, "specific brush drawing function") only for the X line (Step S103).

On the other hand, when a drawing process can be performed at a higher speed by the regular drawing process (Step S102: "regular drawing"), the regular-drawing processing unit 116 sets a regular drawing function (Step S104).

If a drawing process is performed with respect to the drawing memory 200 every predetermined length after brush patterns are generated for the entire Xn line, the drawing process can be performed at a higher speed compared to a case where the drawing process is performed every time the brush pattern is generated for each predetermined length. Therefore, in the present embodiment, when the Xn line is formed of a single pattern, the specific brush drawing function is set.

When both a brush pattern that can be processed at a high speed and a brush pattern that cannot be processed at a high speed are present in a single drawing area, it is costly to determine which brush pattern is to be set to which part of the drawing area. Therefore, in the present embodiment, when the ratio of the number of lines each being formed of a single pattern to the total number of lines of the brush setting command exceeds a threshold, the specific brush drawing function is set for the X lines each being formed of a single pattern.

Figure 8:
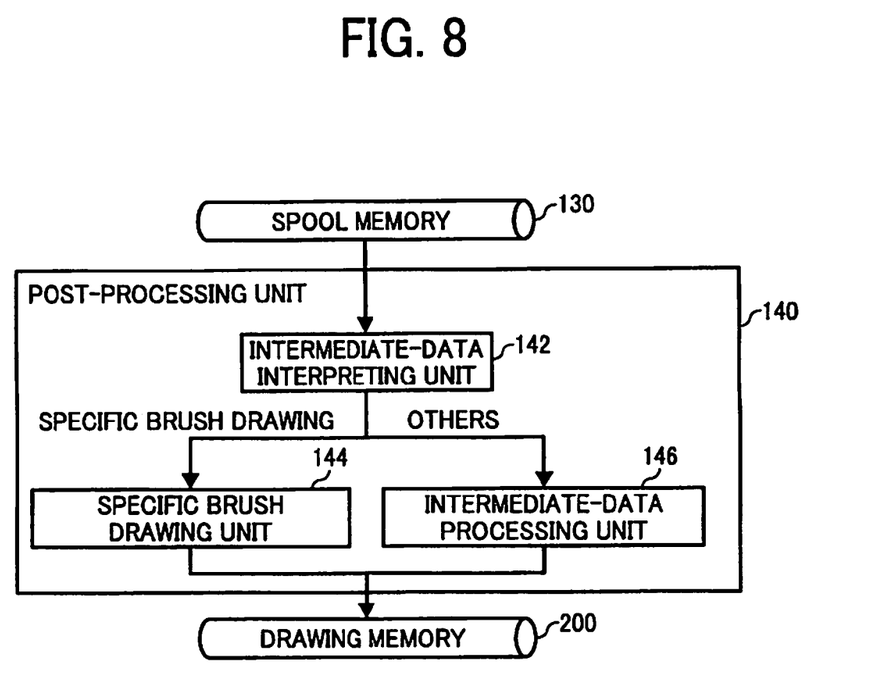
FIG. 8 is a functional block diagram of a post-processing unit shown in FIG. 3.

FIG. 8 is a functional block diagram of the post-processing unit 140. The post-processing unit 140 includes an intermediate-data interpreting unit 142, a specific brush drawing unit 144, and an intermediate-data processing unit 146.

The intermediate-data interpreting unit 142 interprets the intermediate data read from the spool memory 130. The specific brush drawing unit 144 performs brush drawing based on the specific brush drawing function. The intermediate-data processing unit 146 performs a process corresponding to the intermediate data other than the specific brush drawing.

Figure 9:
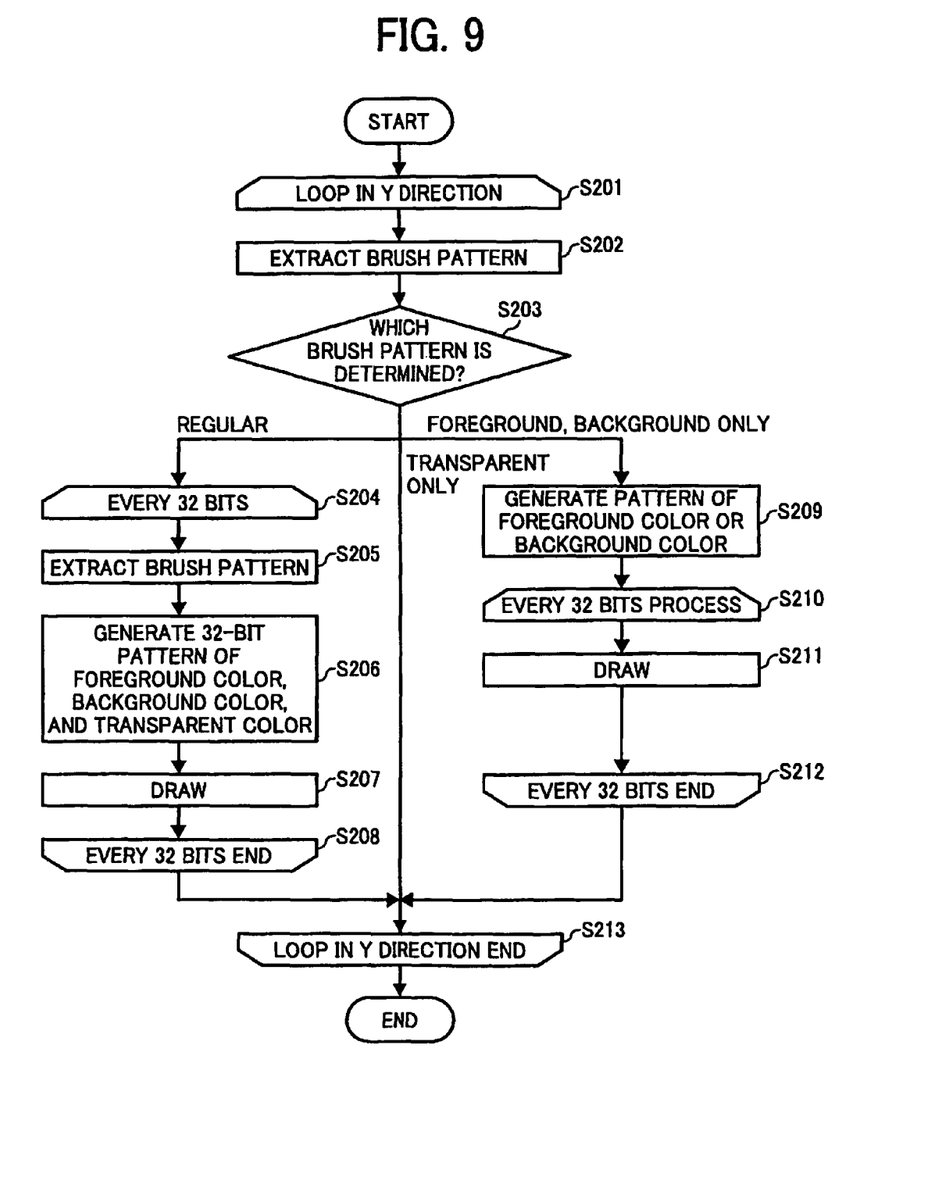
FIG. 9 is a flowchart of a process procedure performed by the post-processing unit shown in FIG. 8.

FIG. 9 is a flowchart of a process procedure performed by the specific brush drawing unit 144.

When a loop in the Y direction is started (Step S201), the intermediate data stored in the spool memory 130 is interpreted, and then a brush pattern is extracted based on the specific brush drawing function (Step S202). Then, the brush pattern for each X line is determined (Step S203).

When the brush pattern of the Xn line is determined to be a regular pattern as a result of the determination made at Step S203 (Step S203: regular), a drawing process is performed every 32 bits for the Xn line. Specifically, a brush pattern of a corresponding part of the Xn line is extracted, and 32-bit patterns in a foreground color, a background color, and transparent color are generated and drawn in the drawing memory 200. The process is performed every 32 bits until the drawing of the Xn line is finished (Step S204 to S208). When the drawing of the Xn line is finished, process control returns to Step S203, and a subsequent X line is processed.

On the other hand, when the brush of the Xn line is determined to be in a single pattern formed of the foreground part or the background part as a result of determination made at Step S203 (Step S203: foreground, background only), patterns are generated for the entire Xn line (Step S209). Then, the drawing every 32 bits is started (Step S210), and drawing is performed in the drawing memory 200 for each 32 bits (Step S211). When the drawing of the Xn line is finished (Step S212), process control returns to Step S203, and a subsequent X line is processed.

When the brush pattern of the Xn line is determined to be a single pattern formed only of a transparent part as a result of the determination made at Step S203 (Step S203: transparent part only), a part to be drawn is not present. Therefore, process controls ends, and a subsequent X line is processed. When the drawing for all the drawing area is finished, the loop of the Y direction is ended (Step S213).

As described above, according to the image processing apparatus 100, when the brush of the Xn line of the brush setting command is determined to be in a single pattern, the specific brush drawing function is set, and the drawing is performed with respect to the drawing memory 200 after the patterns are generated for the entire Xn line. Therefore, a high-speed brush drawing process can be attained.

Moreover, a feature is determined to select a drawing processing method before interpreting the drawing command and converting the drawing command into the intermediate data (before the spool phase). Therefore, the drawing command can be shared while a drawing processing method can be selected for each graphic condition setting command such as the brush setting command. As a result, efficient processing can be achieved.

Furthermore, determination is made whether a ratio of the number of lines in which a brush pattern of the brush setting command is formed of a single pattern to the total number of the lines of the brush setting command exceeds the threshold, and a drawing processing method is selected based on a result of the determination. Moreover, a drawing processing method is selected based on a ratio of the number of lines that can be processed at a high speed to the total number of lines to be processed to save costs of determining which brush pattern is to be employed when a pattern that can be processed at a high speed and a pattern that cannot be processed at a high speed are both present in a single drawing area. Therefore, it is possible to suppress disturbance of speeding up the drawing process caused by a process to determine the brush pattern, and increase the number of conditions enabling a high speed process.

Moreover, a feature of the Y line is determined when drawing data is to be rotated by 90 degrees or 270 degrees. Therefore, even when drawing data is to be rotated, high speed drawing processing can be employed.

Figure 10:
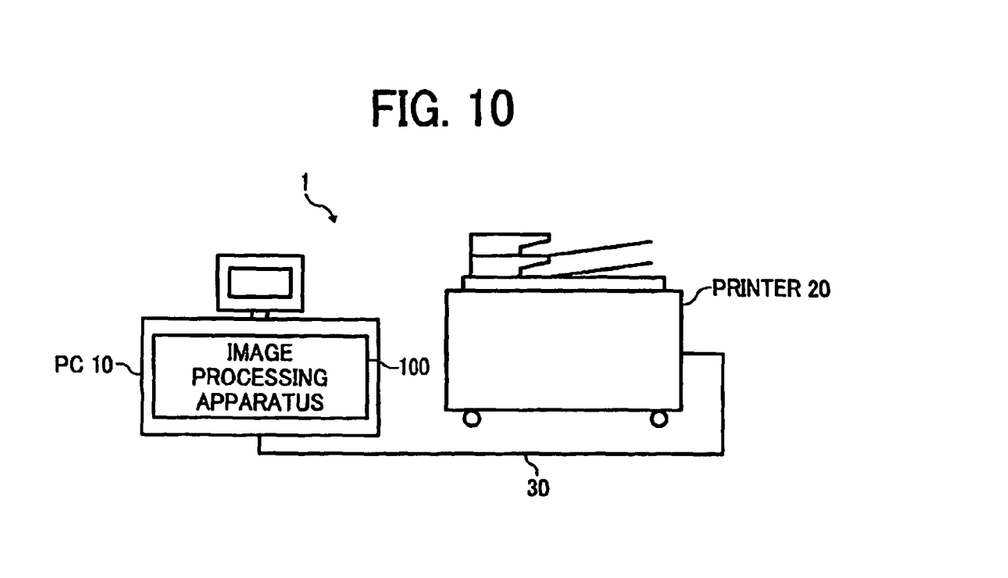
FIG. 10 is a schematic diagram of another configuration of the image processing system.

In an environment that the PC 10 has higher performance than the printer 20, it can be configured that the image processing apparatus 100 is installed in the PC 10 and the drawing command including the brush setting command is executed in the drawing data using a resource of the PC 10 as shown in FIG. 10. Due to processing by the PC 10, a load on the printer 20 can be reduced and the resource of the PC 10 can be effectively used.

Figure 11:
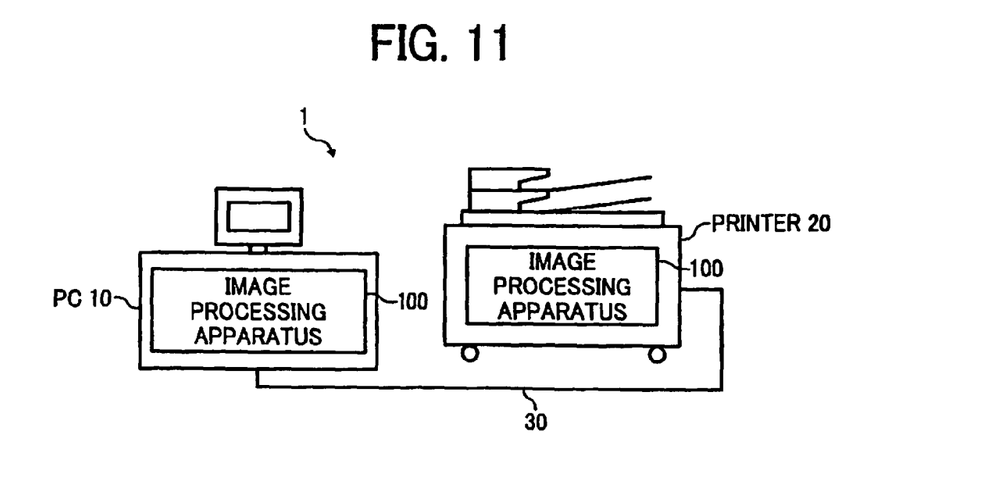
FIG. 11 is a schematic diagram of still another configuration of the image processing system.

Moreover, the image processing apparatus 100 can be installed in each of the PC 10 and the printer 20 so that processes can be performed by both the PC 10 and the printer 20 as shown in FIG. 11. For example, the spool phase processing is performed by the PC 10 while the despool phase processing is performed by the printer 20. This enables distribution of processing loads depending on the performance of the PC 10 and the printer 20.

The object of the present invention can also be achieved by providing, to a system or a device, a recording medium storing therein program codes of software that implements the functions of the image processing apparatus described above, and by executing the program codes stored in the recording medium using the system or a computer (or central processing unit (CPU), micro processing unit (MPU), digital signal processor (DSP)) of the device. In this case, the program codes read from the recording medium implements the functions of the image processing apparatus described above, and the program codes or the recording medium storing therein the computer programs with the program codes constitutes the present invention. As the recoding medium to provide the program codes, an optical recoding medium, a magnetic recoding medium, a magneto-optical recording medium, and a semiconductor recording medium, such as a flexible disk (FD), a hard disk, an optical disk, an magneto-optical disk, a compact-disk read only memory (CD-ROM), a CD recordable (CD-R), a magnetic tape, a nonvolatile memory, and a ROM, can be used.

Furthermore, the functions of the image processing apparatus described above can be implemented not only by executing the program codes that is read by the computer, but also by executing a part or all of actual processing by an operating system (OS) working on the computer based on instructions of the program codes.

Moreover, the functions of the image processing apparatus described above can be implemented by writing the program codes read from the recording medium in an extension board inserted in the computer or a memory provided in a function extension unit connected to the computer, and then by executing a part or all of the actual processing using the function extension board or a CPU of the function extension unit based on instructions of the program code.

According to an aspect of the present invention, an image processing apparatus that can perform a drawing process for a background at a high speed can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus that generates drawing data based on a drawing command, the drawing command including a background setting command that sets a background of the drawing data, the image processing apparatus comprising:
   a feature determining unit that determines a feature of a background for each line in the drawing command; and
   a background drawing unit that selects for each line a drawing method enabling a high-speed drawing process depending on the feature of that line, and draws drawing data corresponding to the background based on the background setting command and selected drawing method, wherein
   when performing rotation drawing processing, the feature determining unit determines the feature after the rotation drawing processing, with respect to a feature determining direction before the rotation drawing processing.

2. The image processing apparatus according to claim 1, wherein the feature determining unit determines the feature before spooling.

3. The image processing apparatus according to claim 1, wherein
   the feature determining unit determines whether a background for each line in the drawing command is formed of a single pattern, and
   the background drawing unit draws drawing data for one entire line for a line whose background is formed of the single pattern, and draws drawing data for predetermined lengths for a line whose background is not formed of the single pattern.

4. The image processing apparatus according to claim 3, wherein the single pattern is formed of one of a foreground color part, a background color part, and a transparent part.

5. The image processing apparatus according to claim 3, wherein
   the feature determining unit determines whether a ratio of number of lines formed of the single pattern to total number of lines of the background setting command exceeds a threshold, and
   the background drawing unit, when the ratio exceeds the threshold, draws drawing data for one entire line for a line whose background is formed of the single pattern.

6. The image processing apparatus according to claim 1, wherein the image processing apparatus is installed in either one of an image forming apparatus or an information processing apparatus.

7. An image processing method of generating drawing data based on a drawing command, the drawing command including a background setting command that sets a background, the image processing method comprising:
   determining a feature of a background for each line in the drawing command;
   selecting for each line a drawing method enabling a high-speed drawing process depending on the feature of that line; and
   drawing drawing data corresponding to the background based on the background setting command and the drawing method selected at the selecting, wherein
   when performing rotation drawing processing, determining the feature after the rotation drawing processing, with respect to a feature determining direction before the rotation drawing processing.

8. A non-transitory computer readable recording medium having recorded thereon the computer program for generating drawing data based on a drawing command, the computer program causing a computer to execute:
   determining a feature of a background for each line in the drawing command;
   selecting for each line a drawing method enabling a high-speed drawing process depending on the feature of that line; and
   drawing drawing data corresponding to the background based on the background setting command and the drawing method selected at the selecting wherein
   when performing rotation drawing processing, determining the feature after the rotation drawing processing, with respect to a feature determining direction before the rotation drawing processing.

* * * * *